H. W. Millar.
Cheese Hoop.

Nº 96,942.      Patented Nov. 16, 1869.

WITNESSES:  
William M. Davis  
A. B. Dobson

INVENTOR:  
Henry W. Millar

United States Patent Office.

HENRY W. MILLAR, OF UTICA, NEW YORK.

Letters Patent No. 96,942, dated November 16, 1869.

IMPROVEMENT IN CHEESE-HOOPS.

The Schedule referred to in these Letters Patent and making part of the same.

To all whom it may concern:

Be it known that I, HENRY W. MILLAR, of Utica, in the county of Oneida, and State of New York, have invented a new and improved Cheese-Hoop; and I do declare that the following is a full and exact description thereof, reference being had to the accompanying drawings, and the letters of reference marked thereon.

Figure 1:
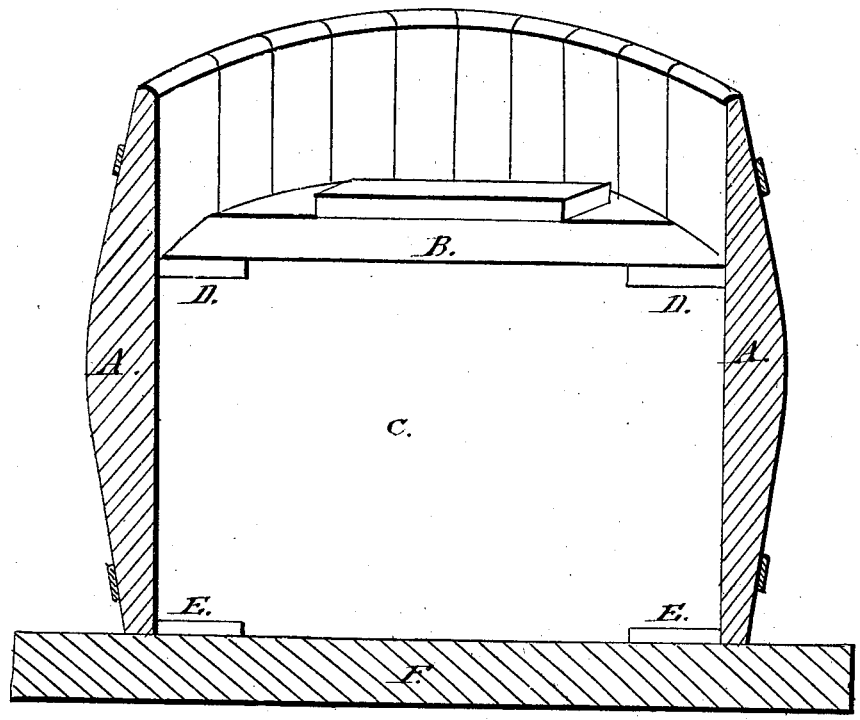
Figure 1 represents a cheese-hoop, cut in two, perpendicularly, through the centre.
Figure 2:
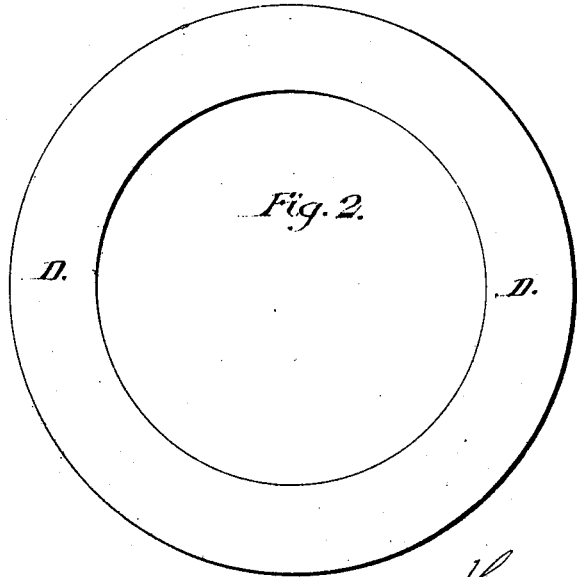
Figure 2 represents a rubber ring or washer.

In fig. 1—

Letter A represents the cheese-hoop.

B, the follower of the cheese-hoop.

C, the cheese.

D and E, the rubber or elastic washers or rings.

F, the press-board, on which the hoop and cheese stand.

The nature of my invention consists in the use of a rubber or elastic washer or ring, in combination with the follower of a cheese-hoop, for the purpose of preventing the curd from rising up around the edge of the follower when the cheese is being pressed, and in the use of a similar ring or washer, at the bottom of the hoop, between the curd or cheese and the press-board, on which it rests, for preventing the curd from pressing out under the bottom of the hoop.

They also take the place of press-cloths now in use.

To enable others skilled in the art to make and use my invention, I will proceed to describe its construction and operation.

It consists of a rubber or elastic washer or ring, E, placed on the inner side of the cheese-hoop A, under the cheese C, resting on the press-board F, and a similar washer or ring, D, placed over the cheese or curd C, directly under the follower B.

Both of these rings are made to fit loosely the cheese-hoop A.

When the pressure is applied to the follower B, it causes the elastic ring to expand and fit closely to the hoop A, thus preventing the curd from pressing either out under the bottom of the hoop or up between the follower and the sides of the hoop.

By the use of the upper elastic washer D, the follower B may be made to fit much looser than now usual, thus allowing it to be readily removed at any time.

Frequently, in the hoops now in use, it is almost impossible to remove it, as it becomes so much swelled in consequence of its being saturated with the whey pressed out of the curd.

By using these two washers, the use of two press-cloths is avoided, thus saving considerable expense and labor, besides being much more durable.

If necessary, instead of these elastic pieces being made in the form of a washer, they may be a whole circular piece, that is, the centre not being cut out to form a washer. The thickness, of course, is not material, as that may vary with the size of the hoops.

What I claim as my invention, and desire to secure by Letters Patent, is—

The packing rings D E, of rubber or similar elastic material, when applied as herein described in the pressing of cheese.

HENRY W. MILLAR.

Witnesses:
WILLIAM M. DAVIES,
A. B. DOBSON.